US012649860B2

(12) United States Patent
Urano et al.

(10) Patent No.: US 12,649,860 B2
(45) Date of Patent: Jun. 9, 2026

(54) TREATMENT LIQUID, INKJET INK SET, AND METHOD FOR PRODUCING PRINTED MATTER

(71) Applicant: RISO KAGAKU CORPORATION, Tokyo (JP)

(72) Inventors: Yuki Urano, Ibaraki (JP); Masanori Ito, Ibaraki (JP); Ryo Shinotsuka, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 910 days.

(21) Appl. No.: 17/860,272

(22) Filed: Jul. 8, 2022

(65) Prior Publication Data

US 2023/0107262 A1 Apr. 6, 2023

(30) Foreign Application Priority Data

Sep. 28, 2021 (JP) ................................. 2021-158265

(51) Int. Cl.
*C09D 11/38* (2014.01)
*B41M 5/00* (2006.01)

(52) U.S. Cl.
CPC ........... *C09D 11/38* (2013.01); *B41M 5/0047* (2013.01)

(58) Field of Classification Search
CPC ..... C09D 11/38; C09D 11/102; C09D 11/322; C09D 11/40; C09D 11/54; B41M 5/0047; B41M 5/0064; B41M 5/0017
See application file for complete search history.

(56) References Cited

U.S. PATENT DOCUMENTS

| | | | |
|---|---|---|---|
| 7,048,356 B2 | 5/2006 | Ishikawa et al. | |
| 8,186,793 B2 | 5/2012 | Hosaka et al. | |
| 10,696,860 B2 | 6/2020 | Matsuzaki | |
| 2010/0029804 A1* | 2/2010 | Nakayama | C08G 18/3876 522/172 |
| 2010/0034973 A1 | 2/2010 | Ohya et al. | |
| 2013/0176369 A1* | 7/2013 | Gotou | B41M 5/0023 347/100 |
| 2015/0174920 A1* | 6/2015 | Namba | B41J 2/2107 347/102 |
| 2016/0090497 A1* | 3/2016 | Ito | B41J 2/2107 347/100 |
| 2023/0018170 A1* | 1/2023 | Okada | D06P 5/225 |
| 2023/0141725 A1* | 5/2023 | Asakawa | C09D 11/108 347/100 |

FOREIGN PATENT DOCUMENTS

| | | | |
|---|---|---|---|
| CN | 101389481 A | 3/2009 | |
| JP | 2005-119115 A | 5/2005 | |
| JP | 2019-65087 A | 4/2019 | |
| WO | 2008/102722 A1 | 8/2008 | |
| WO | WO-2018190328 A1 * | 10/2018 | D06M 15/267 |
| WO | WO-2020090212 A1 * | 5/2020 | |

OTHER PUBLICATIONS

English machine translation of WO-2020090212-A1 (Year: 2020).*
English machine translation of WO-2018190328-A1 (Year: 2018).*
Official Action issued in CN Patent Application No. 202211188500.3, Jun. 27, 2023.

* cited by examiner

*Primary Examiner* — Amber R Orlando
*Assistant Examiner* — Jeffrey Eugene Barzach
(74) *Attorney, Agent, or Firm* — GREENBLUM & BERNSTEIN, P.L.C

(57) ABSTRACT

A treatment liquid which is applied to a substrate by an inkjet system, and includes water, a coagulant, and a surfactant, in which the coagulant contains a polycondensate of an aliphatic amine and an epihalohydrin, and a diallyldialkylammonium halide-based polymer, at a mass ratio of 20:80 to 90:10, and the surfactant contains a fluorine-based surfactant and a silicone-based surfactant.

10 Claims, No Drawings

TREATMENT LIQUID, INKJET INK SET, AND METHOD FOR PRODUCING PRINTED MATTER

CROSS REFERENCE TO RELATED APPLICATIONS

This application is based upon and claims the benefit of priority from the prior Japanese Patent Application No. 2021-158265, filed on Sep. 28, 2021, the entire contents of which are incorporated by reference herein.

BACKGROUND OF THE INVENTION

Field of the Invention

The present invention relates to a treatment liquid, an inkjet ink set, and a method for producing printed matter.

Description of the Related Art

An ink jet recording system is a printing system in which a liquid ink having high fluidity is jetted from fine nozzles and adhered to a substrate to thereby perform printing. This system enables printing of high-resolution and high-quality images to be conducted at high speed and with little noise using a relatively inexpensive device, and has therefore rapidly become widespread in recent years. In terms of inks, aqueous-type inks have become widespread since it is possible to obtain printed matter having high image quality at low cost. Aqueous inks have enhanced drying properties due to containing water, and also have an advantage of excellent environmental friendliness.

In printing methods that use aqueous inks containing binder resins, the drying of the printed matter causes the binder resin to form a film, which provides image fixability and enables printing on a variety of substrates. Patent Document 1 (Domestic Re-publication of PCT International Application 2008-102722) proposes a method with which it is possible to print on media of different water absorption properties such as fabrics and non-water absorbent recording media by printing an aqueous inkjet ink while heating the media, the aqueous inkjet ink containing a soluble resin having a specific acidic group, a solvent with a surface tension of 25 mN/m or more and 40 mN/m or less, and a silicone-based or fluorine-based surfactant.

There are methods to pretreat a substrate before printing an aqueous ink. A well-known substrate pretreatment method is to apply a pretreatment liquid to a substrate in a certain area by roller application, spray application, a wire bar coater, or the like. Recently, methods of applying a pretreatment liquid to a substrate with an inkjet system have been studied.

Patent Document 2 (Japanese Unexamined Patent Application Publication No. 2005-119115) proposes a method for performing inkjet recording with a reaction liquid and an aqueous ink being jetted from respective nozzle arrays mounted in the same recording head, in which the amount of reaction liquid jetted with respect to the aqueous ink is varied according to the position in the scanning direction within a predetermined band, thereby controlling the reaction amount of the reaction liquid and aqueous ink to increase at positions where the reaction liquid penetrates more into the recording medium due to a difference in landing time, and reducing color irregularities within the band.

Patent Document 3 (Japanese Unexamined Patent Application Publication No. 2019-65087) proposes a method for adhering a reaction liquid and aqueous ink to a recording medium by means of an inkjet method, in which the reaction liquid contains a coagulant, water, and a surfactant, the amount of the surfactant is 2 to 10% by mass relative to the total mass of the reaction liquid, and the ratio on the recording medium of the amount of the surfactant included in the reaction liquid and the amount of the surfactant included in the aqueous ink is specified, thereby facilitating wetting and spreading of the reaction liquid and the aqueous ink on the recording medium, and suppressing the occurrence of pinholes in the printed matter.

SUMMARY OF THE INVENTION

One aspect of the present invention is a treatment liquid that is applied to a substrate by an inkjet system, the treatment liquid containing water, a coagulant, and a surfactant, in which the coagulant contains a polycondensate of an aliphatic amine and an epihalohydrin, and a diallyldialkylammonium halide-based polymer, at a mass ratio of 20:80 to 90:10, and the surfactant contains a fluorine-based surfactant and a silicone-based surfactant.

Another aspect of the present invention is an inkjet ink set including the treatment liquid and an aqueous inkjet ink.

Yet another aspect of the present invention is a method for producing printed matter, the method including applying the treatment liquid to a substrate by an inkjet system, and applying an aqueous inkjet ink by an inkjet system with a wet-on-wet method to the substrate to which the treatment liquid has been applied.

DETAILED DESCRIPTION OF THE EMBODIMENTS

The present invention is described below using one embodiment. The examples in the following embodiment in no way limit the present invention.

Aqueous inks have high surface tension due to containing water, and in addition, when a water-soluble organic solvent is also included, the drying time tends to be longer due to hydrogen bonding. Therefore, when an aqueous ink is applied to a substrate having low surface free energy, there is a problem in that the substrate repels the ink and drying time is required. In addition, when the composition of an aqueous ink is adjusted to suit such substrates, there is a problem in that it becomes difficult to print on other substrates having different permeability and maintain image quality. In the method disclosed in Patent Document 1, preventing image quality degradation due to ink mixing while ensuring wetting and spreading on non-water absorbent recording media are contradictory actions, and thus there is a problem in that coatings on substrates having poorer wettability are not sufficiently uniform, and image irregularities occur in solid images in particular.

When a pretreatment liquid is applied with an inkjet system, it is difficult to apply the pretreatment liquid uniformly to the substrate, and printing using an aqueous ink on a substrate that has not been pretreated uniformly may result in image quality degradation.

In the method disclosed in Patent Document 2, it is possible to suppress image irregularities in the band direction but control of the printing system becomes complicated, and furthermore image irregularities may not be sufficiently suppressed depending on the substrate material. In addition, in order to promote the aggregation of ink components on the substrate and improve image quality such as fine print reproducibility, it is desirable to further select a coagulant for a pretreatment liquid.

In the method disclosed in Patent Document 3, the type and amount of surfactant used are investigated in order to facilitate the wetting and spreading of a reaction liquid and aqueous ink on a recording medium, but an investigation is not carried out into the jetting recovery performance after an inkjet head filled with the pretreatment agent has been left to stand when a stronger coagulant is used for the pretreatment agent. When a polymer having strong cationic properties is included in a pretreatment liquid, the polymer may crystallize and cause nozzle clogging. This polymer crystallization can also be caused by interaction with a surfactant, and it is therefore desirable to select a coagulant so that there is an improvement in the jetting recovery performance after the pretreatment liquid has been left to stand, as well as an improvement in the wetting and spreading of the pretreatment liquid on the substrate.

A treatment liquid according to one embodiment is a treatment liquid that is applied to a substrate by an inkjet system, and contains water, a coagulant, and a surfactant, in which the coagulant contains a polycondensate of an aliphatic amine and an epihalohydrin, and a diallyldialkylammonium halide-based polymer, at a mass ratio of 20:80 to 90:10, and the surfactant contains a fluorine-based surfactant and a silicone-based surfactant.

Accordingly, it is possible to provide a treatment liquid that can be applied by an inkjet system, has excellent jetting recovery performance after an inkjet head has been left to stand, and can be applied to various substrates in such a way that high quality images can be formed by an aqueous ink.

In an aqueous ink, a pigment or the like is dispersed due to electrostatic repulsion and steric hindrance, but by adding a coagulant to a substrate before or after applying the aqueous ink, the electrostatic repulsion force of the pigment or the like in the aqueous ink is suppressed on the substrate and the pigment or the like coagulates, and it is possible to cause a loss in the fluidity of the ink. It is thereby possible to suppress the coalescing of ink droplets, excessive penetration of the ink, and so forth on the substrate. By applying a treatment liquid with an inkjet system, it is possible to apply the treatment liquid only to printing areas, and it is also possible to apply the treatment liquid only to areas superposing a printed image. Furthermore, the printing system can be simplified by applying both a treatment liquid and an aqueous ink to a substrate with an inkjet system.

A diallyldialkylammonium halide-based polymer is a type of cationic polymer, and functions as a coagulant by causing an aqueous ink to aggregate on a substrate. A diallyldialkylammonium halide-based polymer has high hydrophobicity, which is one factor for crystallization occurring when water and a neutralizing agent volatilize as a result of the head being left to stand, which may cause misfiring of the treatment liquid. This trend is particularly notable when a low polarity component such as a fluorine-based surfactant is present in the treatment liquid. In the present disclosure, a method has been found to prevent crystallization that causes misfiring, while still utilizing the aggregation action afforded by a diallyldialkylammonium halide-based polymer.

With a mass ratio of 20:80 or higher of a polycondensate of an aliphatic amine and an epihalohydrin to a diallyldialkylammonium halide-based polymer, by including the polycondensate of an aliphatic amine and an epihalohydrin at a high ratio, crystallization caused by the diallyldialkylammonium halide-based polymer can be suppressed, and the jetting recovery performance after being left to stand can be improved. Although the principle is not certain, it can be inferred as follows. A polycondensate of an aliphatic amine and an epihalohydrin is highly hydrophilic, and precipitation is unlikely to occur even if water and a neutralizing agent volatilize to some extent. Furthermore, a polycondensate of an aliphatic amine and an epihalohydrin has a nitrogen atom in the molecular backbone similar to a diallyldialkylammonium halide-based polymer, and it is therefore feasible that polymers are likely to interact with each other and the intermolecular distance is also likely to be close. Therefore, when a polycondensate of an aliphatic amine and an epihalohydrin and also a diallyldialkylammonium halide-based polymer are included in a mixed state in a treatment liquid, even if water and a neutralizing agent derived from the diallyldialkylammonium halide-based polymer volatilize, it is thought that the polycondensate of an aliphatic amine and an epihalohydrin supplies a neutralizing agent to the diallyldialkylammonium halide-based polymer and prevents a decline in solubility, and enters the spaces between the molecules of the diallyldialkylammonium halide-based polymer, thereby suppressing crystallization caused by the diallyldialkylammonium halide-based polymer.

The treatment liquid according to one embodiment can be applied to various substrates, and can provide printed matter having high image quality using an aqueous ink. The key points of image quality are firstly uniform application of the treatment liquid to the substrate and uniform aggregation of the ink components on the substrate, and secondly an appropriate reaction speed with the ink components. As a result, image cracking is prevented, high quality images with few image irregularities can be obtained, and high quality images with high image density can be obtained.

The polycondensate of an aliphatic amine and an epihalohydrin and the diallyldialkylammonium halide-based polymer included in the treatment liquid act as coagulants. In particular, a diallyldimethylammonium halide-based polymer can cause uniform aggregation of ink components due to the ink components aggregating after the treatment liquid and an aqueous ink sufficiently mix on the substrate. In a state where the treatment liquid and the aqueous ink aggregate on the substrate without sufficiently mixing, portions where the ink components have reacted excessively with the coagulants and aggregated, and portions where the ink components have hardly reacted with the coagulants and have not aggregated are both present. This may cause image irregularities due to the combined presence of portions where the ink components have aggregated and portions where the ink components have not aggregated on the substrate. In addition, in an ink containing a water-dispersible resin that is a binder resin, portions where the distance between resin particles is close (aggregated portions) and portions where the distance is far (non-aggregated portions) are both present on the substrate, which may cause non-uniform film formation and image cracking in a drying step after an aqueous ink has been applied.

The cyclic amine backbone of a diallyldialkylammonium halide-based polymer has the ability to disperse colorants and the like. This, combined with the aggregation performance brought about by cationic groups, is considered to make the aggregation performance of the ink relatively moderate. Furthermore, with only a diallyldialkylammonium halide-based polymer, the aggregation properties of ink components on the substrate are moderate, and fine print reproducibility and the like may deteriorate. On the other hand, a polycondensate of an aliphatic amine and an epihalohydrin is highly hydrophilic and has the property of spreading easily in an aqueous solution, and thus amino groups, which are reaction points with the ink components, easily come into contact with particles in the ink, and as a result the reaction of the coagulants with the ink components is promoted. Therefore, combined use of a polycondensate of an aliphatic amine and an epihalohydrin and a diallyldimethylammonium halide-based polymer can further improve image quality, particularly fine print reproducibility, even more.

By including a fluorine-based surfactant and a silicone-based surfactant in the treatment liquid, the treatment liquid wets and spreads quickly on the substrate after the treatment liquid is applied to the substrate, and the treatment liquid can be applied uniformly to the substrate.

A fluorine-based surfactant tends to orient toward the gas-liquid interface and a silicone-based surfactant tends to orient toward the interface with the substrate, and therefore it is thought that the contact angle of the treatment liquid with the substrate can be reduced to a notable extent. In addition, by including a fluorine-based surfactant and a silicone-based surfactant, the fluorine-based surfactant and the silicone-based surfactant form an aggregate, and it is thought that the contact angle with the substrate can be efficiently reduced. For example, even though it is difficult for a fluorine-based surfactant to orient toward the interface with the substrate, due to the fluorine-based surfactant forming an aggregate with the silicone-based surfactant, orientation also toward the interface with the substrate is facilitated, and the surfactants are uniformly distributed at the interface with the substrate, which is thought to enhance wettability with respect to the substrate.

A substrate to which the treatment liquid is applied may be either a permeable substrate or a non-permeable substrate. In the case of a non-permeable substrate, according to one embodiment, it is possible to obtain uniform image quality with no image cracking and few image irregularities due to the treatment liquid easily wetting and spreading on the substrate and the ink components and coagulants easily aggregating in a uniform manner on the substrate, and also excellent image quality in terms of fine print reproducibility due to a sufficient aggregation action being obtained on the substrate. Excellent image quality can also be obtained with a permeable substrate. In the case of a permeable substrate, it is desirable to have a quicker reaction speed between the ink components and the treatment liquid on the substrate. If the reaction speed between the ink components and the treatment liquid on the substrate is slow, the ink may penetrate excessively into the substrate, and the image density may decrease. Since a polycondensate of an aliphatic amine and an epihalohydrin is highly hydrophilic as previously mentioned, the reaction speed with ink components in a wet state is quick on a substrate, and it is possible to increase image density on a permeable substrate.

[Treatment Liquid]

The treatment liquid is applied to a substrate by an inkjet system, and can contain water, a coagulant, and a surfactant. The treatment liquid can be used applied to the substrate prior to printing using an aqueous ink, and more specifically, can be used applied to the substrate prior to printing using with an aqueous inkjet ink.

The treatment liquid contains, as coagulants, a polycondensate of an aliphatic amine and an epihalohydrin, and a diallyldialkylammonium halide-based polymer. By applying the treatment liquid to the substrate, the coagulants are thereby applied onto the substrate, and the coagulants on the substrate cause aggregation of components such as colorants in an aqueous ink that is applied thereafter, and a high quality image can be formed.

A polycondensate of an aliphatic amine and an epihalohydrin can be obtained by polycondensation of a mixture containing an aliphatic amine and an epihalohydrin. Examples of aliphatic amines include aliphatic monoamines and aliphatic polyamines.

More specific examples of aliphatic amines include monoalkyl monoamines, dialkyl monoamines, alkylenediamines, alkanolamines, polyalkylene glycolamines, and glycol ether amines. Specific examples include alkyl monoamines such as monomethylamine, monoethylamine, dimethylamine, diethylamine, and methylethylamine; alkylenediamines such as ethylenediamine and propylenediamine; alkanolamines such as monoethanolamine, dimethylethanolamine, 1-amino-2-propanol, di-2-propanolamine, diethanolamine, and triethanolamine; polyalkylene glycolamines such as diethylene glycolamine and triethylene glycolamine; and glycol ether amines such as 2-(2-methoxyethoxy)ethylamine and 2-methoxyethylamine. The aliphatic amine is preferably an alkyl amine, and more preferably an alkyl monoamine.

Examples of epihalohydrins include epichlorohydrin and epibromohydrin.

In addition, a polycondensate of an aliphatic amine and an epihalohydrin also includes a polycondensate of an aliphatic amine, an epihalohydrin, and ammonia.

The polycondensate of an aliphatic amine and an epihalohydrin may be obtained by polycondensation of an aliphatic amine and an epihalohydrin, or a halogen atom may be substituted with an organic acid or the like.

The polycondensate of an aliphatic amine and an epihalohydrin is preferably a quaternary ammonium salt, the ratio of secondary or tertiary ammonium salts in the constituent units of the polycondensate of an aliphatic amine and an epihalohydrin is preferably low, and it is more preferable that all the constituent units of cationic groups are quaternary ammonium salts in the constituent units of the polycondensate of an aliphatic amine and an epihalohydrin. It is thereby possible to further prevent foreign matter from being generated as a result of the interaction between the polycondensate of an aliphatic amine and an epihalohydrin and the diallyldialkylammonium halide-based polymer, and to further enhance the jetting recovery performance after being left to stand. The polycondensate of an aliphatic amine and an epihalohydrin is preferably a polycondensate of a dialkyl monoamine and an epihalohydrin, and may be a polycondensate that further contains ammonia or an alkylenediamine together with a dialkyl monoamine and an epihalohydrin. Dimethylamine is preferable as the dialkyl monoamine, and ethylenediamine is preferable as the alkylenediamine. Epichlorohydrin is preferable as the epihalohydrin. It is thereby possible to enhance the interaction with the diallyldialkylammonium halide-based polymer, and to further prevent crystallization caused by the diallyldialkylammonium halide-based polymer, thereby further enhancing the jetting recovery performance after being left to stand.

Specifically, for the polycondensate of an aliphatic amine and an epihalohydrin, an aliphatic amine-epihalohydrin polycondensate and an aliphatic amine-ammonia-epihalohydrin polycondensate are preferable, and an aliphatic amine-epihalohydrin polycondensate is more preferable. More specifically, a dimethylamine-epichlorohydrin polycondensate, a dimethylamine-ammonia-epichlorohydrin polycondensate, and a dimethylamine-ethylenediamineepichlorohydrin polycondensate are preferable, and a dimethylamine-epichlorohydrin polycondensate is more preferable.

The weight average molecular weight (Mw) of the polycondensate of an aliphatic amine and an epihalohydrin is preferably 1,000 to 200,000, and more preferably 2,000 to 100,000. The weight average molecular weight (Mw) of the polycondensate of an aliphatic amine and an epihalohydrin is preferably 50,000 or less, and even more preferably 10,000 or less, from the viewpoint of the jetting properties.

In the present disclosure, the polymer weight average molecular weight is a value obtained by standard polystyrene conversion according to the GPC method. The same applies hereinafter.

Examples of commercially available polycondensates of an aliphatic amine and an epihalohydrin include dimethylamine-ammonia-epichlorohydrin polycondensates such as "UNISENSE KHE1000L", "UNISENSE KHE100L", "UNISENSE KHE101L", "UNISENSE KHE102L", and "UNISENSE KHE105L" manufactured by Senka Corporation, dimethylamine-epihalohydrin polycondensates such as "UNISENSE KHE104L" manufactured by Senka Corporation, and dimethylamine-ethylenediamine-epichlorohydrin polycondensates such as "Catiomaster PE-30" manufactured by Yokkaichi Chemical Co., Ltd.

Examples of diallyldialkylammonium halide-based polymers include homopolymers of a diallyldialkylammonium halide, and copolymers of a diallyldialkylammonium halide and a monomer that can be polymerized therewith. Examples of monomers that can be polymerized with a diallyldialkylammonium halide include acrylamide, sulfur dioxide, and alkyl diallylamines such as methyldiallylamine.

Examples of diallyldialkylammonium halides include diallyldimethylammonium halides and diallyldiethylammonium halides, but diallyldimethylammonium halides are preferable. A diallyldialkylammonium halide is more preferable than a diallyldimethylammonium chloride.

A diallyldialkylammonium halide-based polymer may be obtained by homopolymerization of a diallyldialkylammonium halide or copolymerization with another monomer, or a halogen atom may be substituted with an organic acid or the like.

It should be noted that, since the interaction between a polycondensate of an aliphatic amine and an epihalohydrin and a diallyldimethylammonium halide-based polymer can be enhanced in an aqueous medium by using common neutralizing agents, if one is a halogen, it is preferable that the other also be a halogen, and if one is an organic acid, it is preferable that the other also be an organic acid. More preferably, both neutralizing agents are chlorine.

Specific examples of diallyldialkylammonium halide-based polymers include diallyldimethylammonium chloride homopolymers, diallyldimethylammonium chloride-acrylamide copolymers, diallyldimethylammonium chloride-sulfur dioxide copolymers, and diallyldimethylammonium chloride-methyldiallylamine copolymers.

The weight average molecular weight (Mw) of the diallyldialkylammonium halide-based polymer is preferably 1,000 to 200,000, more preferably 3,000 to 100,000, and even more preferably 5,000 to 10,000. The weight average molecular weight (Mw) of the diallyldialkylammonium halide-based polymer is preferably 50,000 or less, and even more preferably 10,000 or less, from the viewpoint of jetting properties.

Examples of commercially available diallyldialkylammonium halide-based polymers include "PAS-H-1L", "PAS-H-SL", and "PAS-H-10L" manufactured by Nittobo Medical Co., Ltd., diallyldimethylammonium chloride polymers such as "UNISENSE FPA100L" manufactured by Senka Corporation, and diallyldimethylammonium chloride-sulfur dioxide copolymers such as "PAS-A-1" and "PAS-A-5" manufactured by Nittobo Medical Co., Ltd.

The mass ratio (E:D) of a polycondensate (E) of an aliphatic amine and an epihalohydrin to a diallyldialkylammonium halide-based polymer (D) is preferably 20:80 to 90:10, more preferably 30:70 to 80:20, and even more preferably 35:65 to 50:50.

A high ratio of a polycondensate of an aliphatic amine and an epihalohydrin in these ranges of the mass ratio (E:D) enables improvement of the jetting recovery performance after being left to stand, and enables further enhancement of the image quality of printed matter, particularly in terms of image density on a permeable substrate.

A high ratio of a diallyldialkylammonium halide-based polymer in these ranges of the mass ratio (E:D) enables further enhancement of the image quality of printed matter, particularly in terms of uniform image quality and fine print reproducibility on a non-permeable substrate.

The amount of the polycondensate of an aliphatic amine and an epihalohydrin, expressed as the amount of active ingredient relative to the total amount of the treatment liquid, is preferably 0.5 to 15% by mass, more preferably 1 to 10% by mass, and even more preferably 1 to 5% by mass.

The amount of the diallyldialkylammonium halide-based polymer, expressed as the amount of active ingredient relative to the total amount of the treatment liquid, is preferably 0.5 to 15% by mass, more preferably 1 to 10% by mass, and even more preferably 1 to 5% by mass.

The total amount of the polycondensate of an aliphatic amine and an epihalohydrin and the diallyldialkylammonium halide-based polymer, expressed as the amount of active ingredient relative to the total amount of the treatment liquid, is preferably 1 to 20% by mass, and more preferably 5 to 10% by mass.

The treatment liquid may contain coagulants other than the above-mentioned coagulants provided that the effects of the present invention are not impaired.

The treatment liquid can contain a fluorine-based surfactant and a silicone-based surfactant as surfactants. By including these surfactants in the treatment liquid, the affinity between the substrate and the treatment liquid is further enhanced, making it possible for the treatment liquid to be applied more uniformly to the substrate and to enhance the uniformity of the image produced using the aqueous ink applied thereafter.

Examples of fluorine-based surfactants include perfluoroalkyl alkylene oxide adducts, perfluoroalkyl group-containing oligomers, perfluoroalkyl phosphoric acid esters, perfluoroalkyl carboxylic acid esters, perfluoroalkyl quaternary ammonium salts, perfluoroalkylamine oxide compounds, and perfluoroalkyl betaines.

For the fluorine-based surfactant, a nonionic fluorine-based surfactant is preferable, and a perfluoroalkyl alkylene oxide adduct and a perfluoroalkyl group-containing oligomer are more preferable. As a perfluoroalkyl alkylene oxide adduct, a perfluoroalkylene ethylene oxide adduct is more preferable. With a nonionic fluorine-based surfactant, the aforementioned aggregate can be easily formed, and the treatment liquid can be applied more uniformly to the substrate.

Examples of commercially available fluorine-based surfactants include perfluoroalkyl ethylene oxide adducts such as "SURFLON S-242" and "SURFLON S-243", and perfluoroalkyl group-containing oligomers such as "SURFLON S-386".

One fluorine-based surfactant may be used alone or a combination of two or more may be used. The fluorine-based surfactant, expressed as the amount of active ingredient relative to the total amount of the treatment liquid, is preferably 0.1 to 5% by mass, and more preferably 0.5 to 3% by mass.

For a silicone-based surfactant, it is possible to use a compound in which a modified group is introduced into the polysiloxane backbone. The modified group may be introduced at one or both of a terminal position and side chain position of the polysiloxane backbone, but a side chain-type modified silicone-based surfactant in which a modified group has been introduced at a side chain position of the polysiloxane backbone is preferable. By using a side chain-type modified silicone-based surfactant, an aggregate with the aforementioned fluorine-based surfactant can be easily formed, and the treatment liquid can be applied more uniformly to the substrate.

Specific examples of silicone-based surfactants include polyether-modified silicone-based surfactants, alkyl-modified silicone-based surfactants, phenyl-modified silicone-based surfactants, alkyl/aralkyl-comodified silicone-based surfactants, and acrylic-modified silicone-based surfactants. From thereamong, polyether-modified silicone-based surfactants are preferable. In addition, the silicone-based surfactant is preferably a nonionic surfactant.

As a polyether-modified silicone-based surfactant, for example, it is possible to use a compound having a polyalkylene glycol chain in the polysiloxane backbone. In this compound, the polyalkylene glycol chain may be a polyethylene glycol chain, polypropylene glycol chain, polyethylene-propylene glycol chain, a polytrimethylene glycol chain, or the like, but a polyethylene glycol chain is preferable. The number of added moles of a polyalkylene oxide is preferably 5 to 20, and more preferably 8 to 15.

The polyether-modified silicone-based surfactant is preferably a compound in which a polyalkylene glycol chain is introduced into at least one silicon atom of a trisiloxane backbone or tetrasiloxane backbone. In this surfactant, a methyl group that bonds to a siloxane backbone may be substituted with another hydrophobic group such as an alkyl group having a carbon number of 2 or more. Preferable examples include compounds in which one or two polyalkylene glycol chains are introduced into a silicon atom at the 3-position of a trisiloxane backbone, and compounds in which a total of one to four polyalkylene glycol chains are introduced into one or both of silicon atoms at the 3-position and 5-position of a tetrasiloxane backbone. More specific examples include heptamethyltrisiloxane having an alkylene glycol chain introduced at the 3-position, nonamethyltetrasiloxane having an alkylene glycol chain introduced at the 3-position or 5-position, and octamethyltetrasiloxane having alkylene glycol chains introduced at the 3-position and 5-position.

Examples of commercially available silicone-based surfactants include "BYK-302", "BYK-307" "BYK-325" "BYK-331" "BYK-333" "BYK-342" "BYK-345" "BYK-346", "BYK-347", "BYK-348", "BYK-349", and "BYK-378" (all BYK-Chemie Japan K.K.), "L-7001", "L-7002", "L-7604", "FZ-2105", and "8032 ADDITIVE" in the DOWSIL (registered trademark) series (all Toray Dow Corning Co., Ltd.), "KF-6011", "KF-6011P", "KF-6013", "KF-6004", and "KF-6043" (all Shin-Etsu Chemical Co., Ltd.), "Disparlon AQ-7120", "Disparlon AQ-7130", and "Disparlon AQ-7180" (all Kusumoto Chemicals, Ltd.), and "Silface SAG503A", "Silface SAG001", "Silface SAG002", "Silface SAG003", "Silface SAG005", and "Silface SAG008" (all Nisshin Chemical Industry Co., Ltd.) (all product names).

One silicone-based surfactant may be used alone or a combination of two or more may be used. The silicone-based surfactant, expressed as the amount of active ingredient relative to the total amount of the treatment liquid, is preferably 0.1 to 5% by mass, and more preferably 0.5 to 3% by mass. The total amount of the fluorine-based surfactant and silicone-based surfactant, expressed as the amount of active ingredient relative to the total amount of the treatment liquid, is preferably 0.1 to 10% by mass, and more preferably 1 to 3% by mass. This total amount being 10% by mass or less, particularly 3% by mass or less, can further improve the jetting performance of the treatment liquid. The mass ratio of the fluorine-based surfactant to the silicone-based surfactant, expressed as the amount of active ingredient, is preferably 1:10 to 10:1, and more preferably 1:5 to 2:1.

It is preferable that either one of the fluorine-based surfactant and the silicone-based surfactant be water soluble, and it is more preferable that both be water soluble.

The treatment liquid may contain surfactants other than the above-mentioned surfactants provided that the effects of the present invention are not impaired.

The treatment liquid preferably contains water as an aqueous solvent, and the main solvent may be water.

There are no particular limitations on the water but it is preferably water in which the ionic components are as minimal as possible. For example, ion-exchanged water, distilled water, ultrapure water, or the like may be used as the water.

From the viewpoint of adjusting viscosity, the amount of water included relative to the total amount of the treatment liquid is preferably 20 to 90% by mass, more preferably 30 to 80% by mass, and even more preferably 40 to 70% by mass.

The treatment liquid may contain a water-soluble organic solvent. The water-soluble organic solvent is preferably compatible with water. As the water-soluble organic solvent, from the viewpoints of wettability and moisture retention, it is possible to use an organic compound that is liquid at room temperature and soluble in or miscible with water, and it is preferable that a water-soluble organic solvent that mixes uniformly with an equal volume of water at one atmosphere and 20° C. be used.

The boiling point of the water-soluble organic solvent is preferably 180 to 270° C. The boiling point of the water-soluble organic solvent being 180° C. or higher, preferably 200° C. or higher, suppresses evaporation of the water-soluble organic solvent from the treatment liquid and is able to further improve stability within the apparatus. The boiling point of the water-soluble organic solvent being 270° C. or lower reduces the amount of solvent remaining on printed matter after an aqueous ink has been applied and enables further improvement of image durability. From this viewpoint, it is preferable that the water-soluble organic solvent having a boiling point exceeding 270° C. be limited to less than 5% by mass relative to the total amount of the treatment liquid.

Examples of water-soluble organic solvents that may be used include glycols such as ethylene glycol, diethylene glycol, triethylene glycol, tetraethylene glycol, polyethylene glycol, propylene glycol, 1,3-propanediol, dipropylene glycol, tripropylene glycol, polypropylene glycol, 1,2-butanediol, and 1,2-hexanediol; glycerols such as glycerol, diglycerol, triglycerol, and polyglycerol; acetins such as monoacetin and diacetin; glycol ethers such as ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, diethylene glycol monopropyl ether, diethylene glycol monobutyl ether, triethylene glycol monomethyl ether, triethylene glycol monoethyl ether, triethylene glycol monopropyl ether, triethylene glycol monobutyl ether, tetraethylene glycol monomethyl ether, tetraethylene glycol monoethyl ether, tetraethylene glycol dimethyl ether, tetraethylene glycol diethyl ether, dipropylene glycol monomethyl ether, and diethylene glycol benzyl ether; 1-methyl-2-pyrrolidone; 1,3-dimethyl-2-imidazolidinone; β-thiodiglycol; and sulfolane.

One water-soluble organic solvent may be used alone, or a mixture of two or more may be used as long as a single phase is formed.

From the viewpoints of wettability, moisture retention effect, viscosity adjustment, and the like, the amount of water-soluble organic solvent included relative to the total amount of the treatment liquid can be 1 to 80% by mass, more preferably 10 to 50% by mass, and even more preferably 20 to 40% by mass.

The water-soluble organic solvent preferably contains glycols having a boiling point of 200 to 270° C. The amount of glycols having a boiling point of 200 to 270° C. relative to the total amount of the treatment liquid is preferably 10 to 60% by mass, and more preferably 20 to 40% by mass.

The treatment liquid can further contain an amine compound. By including an amine compound in the treatment liquid, the amine compound functions as a rust inhibitor, and rust can be prevented from forming while the treatment liquid is loaded in a printing apparatus. Both a polycondensate of an aliphatic amine and an epihalohydrin and a diallyldialkylammonium halide-based polymer which are coagulants contain acid as a neutralizing agent, and therefore there is a possibility of rust forming on metal members of the inkjet head. By further including an amine compound in the treatment liquid, the amine compound orients at the surface of metal members, and it is possible to prevent the formation of rust on metal members due to acid. In addition, using an amine compound rather than a general rust inhibitor such as benzotriazole or alkylnaphthalenesulfonic acid salt does not cause a reaction with a diallyldialkylammonium halide-based polymer, and the generation of foreign matter from the treatment liquid can be suppressed. For these reasons, the jetting recovery performance of the treatment liquid after leaving the head to stand can be further improved.

The boiling point of the amine compound is preferably 250° C. or less, more preferably 150° C. or less, and even more preferably 100° C. or less. A volatile amine compound having a boiling point in these ranges volatilizes and is removed from the surface of printed matter after being applied to the substrate, preventing interaction with the ink components on the printed matter, and therefore enabling image durability to be further improved.

The boiling point of the amine compound is preferably 70° C. or higher. As a result, volatilization from an inkjet nozzle is prevented, a state is maintained where the amine compound is included at an appropriate amount in the treatment liquid within the inkjet nozzle, and a sufficient rust inhibiting action can be obtained.

For example, the boiling point of the amine compound is preferably 70 to 250° C., more preferably 70 to 150° C., and even more preferably 70 to 100° C.

The amine compound may be any of a primary amine, secondary amine, or tertiary amine, but a tertiary amine is more preferable. A tertiary amine has the advantage of being highly adsorptive to metals, and in addition, due to being volatile, is unlikely to cause a decrease in image durability. The amine compound is preferably an aliphatic amine compound, and specific examples include alkyl amines, alkanolamines, and alkylenediamines. The carbon number of an aliphatic amine in one molecule is preferably 4 to 20, and more preferably 6 to 10.

Examples of amine compounds include primary amines such as methylamine, ethylamine, aminomethylpropanol, aminoethylpropanol, ethylenediamine, and hexamethylenediamine; secondary amines such as dimethylamine, diethylamine, and ethylmethylamine; and tertiary amines such as trimethylamine, triethylamine, triethanolamine, dimethylaminoethanol, diethylaminoethanol, dimethylaminopropanol, triethanolamine, and tetramethylethylenediamine.

From thereamong, triethylamine and dimethylaminoethanol are preferable, and triethylamine is more preferable.

One amine compound may be used alone or a combination of two or more may be used.

The amine compound relative to the total amount of the treatment liquid is preferably 0.1 to 2% by mass, and more preferably 0.5 to 1% by mass. By including the amine compound at 0.1% by mass or more relative to the total amount of the treatment liquid, the jetting recovery performance after being left to stand can be further improved. Due to the amine compound being 2% by mass or less relative to the total amount of the treatment liquid, the jetting recovery performance after being left to stand can be further improved. Furthermore, due to the amount remaining on the printed matter being reduced and the action on the ink components on the printed matter being suppressed, the durability of the image can be further improved.

In addition to the above-mentioned components, the treatment liquid may optionally contain various additives such as rust inhibitors, preservatives, antioxidants, UV absorbers, infrared absorbers, crosslinking agents, pH adjusters, antifoaming agents, wetting agents (humectants), surface tension adjusters (penetrants), and fixing agents.

In order to obtain jetting properties suitable for an inkjet system, the viscosity of the treatment liquid is, at 23° C., preferably 1 to 30 mPa·s, more preferably 3 to 20 mPa·s, and even more preferably 4 to 12 mPa·s.

The method for producing the treatment liquid is not particularly limited, but the desired treatment liquid be obtained by mixing together the components in an appropriate manner. The obtained composition may be filtered using a filter or the like. Furthermore, various additives may be added as appropriate.

[Ink Set]

According to one embodiment, it is possible to provide an inkjet ink set that includes a treatment liquid and an aqueous inkjet ink, in which the treatment liquid is the treatment liquid according to one embodiment described above. This ink set can be used for a printing method in which the treatment liquid and the aqueous inkjet ink are each applied to a substrate by an inkjet system. It is preferable that the treatment liquid be applied to the substrate before the aqueous inkjet ink is applied, and the aqueous inkjet ink be applied thereafter. Hereinafter, the aqueous inkjet ink is also referred to simply as aqueous ink.

The aqueous ink can contain a colorant and water. The colorant can contain a pigment, a dye, or a combination thereof. From the viewpoint of the weather resistance and water resistance of the image, a pigment may be preferably used.

The pigment can be preferably incorporated into the ink as a pigment dispersion.

The pigment dispersion may be one with which the pigment can be dispersed in a solvent and with which the pigment can assume a dispersed state in the ink. Examples of pigment dispersions that can be used include one in which a pigment is dispersed in water with a pigment dispersant, one in which a self-dispersing pigment is dispersed in water, and one in which a microencapsulated pigment obtained by coating a pigment with a resin is dispersed in water.

Pigments which can be used include organic pigments such as azo pigments, phthalocyanine pigments, polycyclic pigments, and dye lake pigments, and inorganic pigments such as carbon blacks and metal oxides. Examples of azo pigments include soluble azo lake pigments, insoluble azo pigments, and condensed azo pigments. Examples of phthalocyanine pigments include metal phthalocyanine pigments and metal-free phthalocyanine pigments. Examples of polycyclic pigments include quinacridone-based pigments, perylene-based pigments, perinone-based pigments, isoindoline-based pigments, isoindolinone-based pigments, dioxazine-based pigments, thioindigo-based pigments, anthraquinone-based pigments, quinophthalone-based pigments, metal complex pigments, and diketopyrrolopyrroles (DPP). Examples of carbon blacks include furnace carbon black, lamp black, acetylene black, and channel black. Examples of metal oxides include titanium dioxide and zinc oxide. These pigments may be used alone or a combination of two or more may be used.

The average particle size of the pigment is preferably 10 to 500 nm, and more preferably from 10 to 200 nm. The average particle size of these pigments is preferably 10 nm or more from the viewpoint of the color development properties, and is preferably 500 nm or less from the viewpoint of dispersion stability. For an inkjet ink, 500 nm or less is preferable from the viewpoint of the jetting properties.

A pigment dispersant typified by polymeric dispersants and surfactants may be preferably used for the pigment to be stably dispersed in the ink.

Examples of commercially available polymeric dispersants include "TEGO Dispers 740W", "TEGO Dispers 750W", "TEGO Dispers 755W", and "TEGO Dispers 760W" of the TEGO Dispers series manufactured by Evonik Japan Co., Ltd., "Solsperse 20000", "Solsperse 27000", "Solsperse 41000", "Solsperse 43000", "Solsperse 44000", and "Solsperse 46000" of the Solsperse series manufactured by The Lubrizol Corporation, "Joncryl 57J", "Joncryl 60J", and "Joncryl 63J" of the Joncryl series manufactured by BASF Japan Ltd., and "DISPERBYK-102", "DISPERBYK-185", "DISPERBYK-190", "DISPERBYK-193", "DISPERBYK-199", and "BYKJET-9152" manufactured by BYK-Chemie Japan K.K. (all product names).

In consideration of the dispersion stability of the pigment in the ink, a nonionic surfactant can be used as a surfactant-type dispersant.

Examples of commercially available surfactant-type dispersants include nonionic surfactants such as "EMULGEN A-60", "EMULGEN A-90", "EMULGEN A-500", and "EMULGEN 420" of the EMULGEN series manufactured by Kao Corporation (all product names).

One pigment dispersant may be used alone or a combination of two or more may be used.

In cases where a pigment dispersant is used, the amount of the pigment dispersant added varies depending on the type used and there are no particular limitations thereon. For example, the pigment dispersant, expressed as a mass ratio of the active ingredient relative to a value of 1 for the pigment, can be added in an amount within a range of 0.005 to 0.2.

A self-dispersing pigment may be incorporated as the colorant. A self-dispersing pigment is a pigment in which a hydrophilic functional group has been introduced into the surface of the pigment by a chemical treatment or physical treatment. The hydrophilic functional group to be introduced into the self-dispersing pigment is preferably ionic, and the pigment particles can be stably dispersed in water by an electrostatic repulsion force by anionically or cationically charging the surface of the pigment. Examples of preferable anionic functional groups include carboxyl groups, sulfo groups, sulfino groups, sulfuric acid ester groups, phosphoric acid groups, phosphoric acid ester groups, phosphorous acid groups, and phosphorous acid ester groups. Examples of preferable cationic functional groups include quaternary ammonium groups and quaternary phosphonium groups.

These hydrophilic functional groups may be bonded directly to the pigment surface or bonded via other atom groups. Examples of other atom groups include, but are not limited to, alkylene groups, phenylene groups, and naphthylene groups. Examples of the pigment surface treatment method include a diazotization treatment, a sulfonation treatment, a hypochlorous acid treatment, a humic acid treatment, and a vacuum plasma treatment.

Preferable examples of the self-dispersing pigment include "CAB-O-JET 200", "CAB-O-JET 300", "CAB-O-JET 400", "CAB-O-JET 250C", "CAB-O-JET 260M", and "CAB JET 270" of the CAB-O-JET series manufactured by Cabot Corporation, and "BONJET BLACK CW-1", "BONJET BLACK CW-2", and "BONJET BLACK CW-4" manufactured by Orient Chemical Industries Co., Ltd. (all product names).

A pigment dispersion in which a pigment has been dispersed in advance with a pigment dispersant may be used. Examples of commercially available pigment dispersions in which a pigment has been dispersed with a pigment dispersant include the HOSTAJET series manufactured by Clariant and the FUJI SP series manufactured by Fuji Pigment Co., Ltd. (all product names). A pigment dispersion in which a pigment has been dispersed with an above-mentioned pigment dispersant may be used. Furthermore, a dispersion of a microencapsulated pigment obtained by coating the pigment with a resin may be used.

A dye may be incorporated as a colorant. For the dye, any of the dyes generally used in the technical field of printing may be used without any particular limitations. Specific examples include basic dyes, acid dyes, direct dyes, soluble vat dyes, acid mordant dyes, mordant dyes, reactive dyes, vat dyes, and sulfide dyes. From thereamong, water-soluble dyes or dyes that become water-soluble upon reduction or the like may be preferably used. More specific examples include azo dyes, rhodamine dyes, methine dyes, azomethine dyes, xanthene dyes, quinone dyes, triphenylmethane dyes, diphenylmethane dyes, and methylene blue.

One colorant may be used alone or a combination of two or more may be used.

The amount of the colorant, expressed as an active ingredient amount relative to the total amount of the ink, is preferably 0.1 to 20% by mass, more preferably 1 to 10% by mass, and even more preferably 2 to 5% by mass.

The aqueous ink may further contain a surfactant. The surfactant is able to further enhance the penetration of the ink into the substrate or the wetting and spreading of the ink on the substrate, and to further improve the coating properties of the ink.

A nonionic surfactant, an anionic surfactant, a cationic surfactant, an amphoteric surfactant, or a combination thereof may be preferably used as the surfactant, and including a nonionic surfactant is more preferable.

Examples of nonionic surfactants include silicone-based surfactants, acetylene glycol-based surfactants, fluorine-based surfactants, polyoxyethylene alkyl ether-based surfactants, polyoxypropylene alkyl ether-based surfactants, polyoxyethylene alkyl phenyl ether-based surfactants, polyoxypropylene alkyl phenyl ether-based surfactants, polyoxyethylene fatty acid ester-based surfactants, polyoxypropylene fatty acid ester-based surfactants, sorbitan fatty acid ester-based surfactants, polyoxyethylene sorbitan fatty acid ester-based surfactants, polyoxyethylene sorbitol fatty acid ester-based surfactants, and glycerol fatty acid ester-based surfactants. One nonionic surfactant may be used alone or a combination of two or more may be used.

The nonionic surfactant preferably contains a silicone-based surfactant, an acetylene glycol-based surfactant, or a combination of these. Examples of commercially available silicone-based surfactants include "Silface SAG014" and "Silface SAG002" (product names, manufactured by Nisshin Chemical Industry Co., Ltd.). Examples of commercially available acetylene glycol-based surfactants include the acetylene glycols "OLFINE E1010" and "OLFINE E1020" (both product names, manufactured by Nisshin Chemical Industry Co., Ltd.).

The amount of the surfactant, expressed as an active ingredient amount relative to the total amount of the ink, is preferably 0.1 to 5% by mass, and more preferably 0.2 to 2% by mass.

The aqueous ink may also contain a binder resin. Examples of binder resins include water-dispersible resins, water-soluble resins, and combinations thereof.

Examples of water-dispersible resins include conjugated diene resins such as styrene-butadiene copolymers and methyl methacrylate-butadiene copolymers; acrylic-based resins such as homopolymers or copolymers of acrylic acid esters, methacrylic acid esters, or a combination thereof, or copolymers thereof with styrene or the like; vinyl-based resins such as vinyl chloride-vinyl acetate copolymers and ethylene-vinyl acetate copolymers; functional-group modified resins based on monomers containing functional groups such as carboxyl groups of these various resins; urethane resins; melamine resins; urea resins; polyester resins; polyolefin resins; silicone resins; polyvinyl butyral resins; and alkyd resins. These water-dispersible resins may be used alone or a combination of two or more may be used. These water-dispersible resins may be in the form of an aqueous resin emulsion (O/W type emulsion). The aqueous resin emulsion may be a resin emulsion of an above-mentioned resin alone or a hybrid resin emulsion composed of two or more of the above-mentioned resins. The average particle size of the water-dispersible resin is preferably 0.01 to 0.50 μm, and more preferably 0.05 to 0.30 μm.

Examples of water-soluble resins include polyvinyl alcohol, polyacrylic acid, neutralized products of polyacrylic acid, acrylic acid/maleic acid copolymers, acrylic acid/sulfonic acid copolymers, and styrene/maleic acid copolymers. Furthermore, it is possible to use anionic water-soluble resins in which anionic functional groups have been introduced to these resins.

From the viewpoint of ink fixability, the binder resin preferably contains a water-dispersible resin, and more preferably contains a water-dispersible urethane resin, a water-dispersible polyolefin resin, a water-dispersible acrylic-based resin, or a combination thereof.

Specific examples of water-dispersible urethane resins include anionic resins having a urethane backbone, specifically "SUPERFLEX 150", "SUPERFLEX 300", "SUPERFLEX 460", "SUPERFLEX 470", "SUPERFLEX 740", and "SUPERFLEX 840" manufactured by DKS Co. Ltd., "TAKELAC WS-6021", "TAKELAC W-512-A-6", and "TAKELAC W-6110" manufactured by Mitsui Chemicals Polyurethanes, Inc., "Adeka BONTIGHTER HUX-370" and "Adeka BONTIGHTER HUX-380" manufactured by Adeka Corporation, and "NeoRez R-9660", "NeoRez R-966", "NeoRez R-967", "NeoRez R-986", and "NeoRez R-2170" manufactured by DSM (all product names).

Examples of commercially available water-dispersible polyolefin resins include the Arrowbase series ("Arrowbase SB-1010", "Arrowbase SE-1010", "Arrowbase DC1010", and the like) manufactured by UNITIKA LTD., the HARDLEN series ("NZ1004", "EW5250", "EH801J", and the like) manufactured by Toyobo Co., Ltd., and the AQUACER series ("272", "497", "515", "531", "537", and the like) manufactured by BYK-Chemie GmbH (all product names).

Examples of water-dispersible acrylic-based resins include water-dispersible styrene (meth)acrylic resins and water-dispersible (meth)acrylic resins. The styrene (meth) acrylic resins and water-dispersible (meth)acrylic resins are not particularly limited and commercially available products can be used.

Examples of commercially available water-dispersible styrene (meth)acrylic resins and water-dispersible (meth) acrylic resins include "Mowinyl 966A", "Mowinyl 6750", "Mowinyl 6751D", "Mowinyl 6960", "Mowinyl 6718", and "Mowinyl 7320" manufactured by The Nippon Synthetic Chemical Industry Co., Ltd., "Microgel E-1002" and "Microgel E-5002" manufactured by Nippon Paint Co., Ltd., "VONCOAT 4001" and "VONCOAT 5454" manufactured by DIC Corporation, "SAE1014" manufactured by Zeon Corporation, "SAIVINOL SK-200" manufactured by Saiden Chemical Industry Co., Ltd., "NeoCryl BT-62" and "NeoCryl SA-1094" manufactured by DSM, "Joncryl 7100", "Joncryl 390", "Joncryl 711", "Joncryl 511", "Joncryl 7001", "Joncryl 632", "Joncryl 741", "Joncryl 450", "Joncryl 840", "Joncryl 74J", "Joncryl HRC-1645J", "Joncryl 734", "Joncryl 852", "Joncryl 7600", "Joncryl 775", "Joncryl 537J", "Joncryl 1535", "Joncryl PDX-7630A", "Joncryl 352J", "Joncryl 352D", "Joncryl PDX-7145", "Joncryl 538J", "Joncryl 7640", "Joncryl 7641", "Joncryl 631", "Joncryl 790", "Joncryl 780", and "Joncryl 7610" manufactured by BASF Corporation, "VINYBLAN 2580", "VINYBLAN 2585", "VINYBLAN 2682", "VINYBLAN 2680", "VINYBLAN 2684", "VINYBLAN 2685", and "VINYBLAN 2687" manufactured by Nisshin Chemical Industry Co., Ltd., and "NK Binder R-5HN" manufactured by Shin-Nakamura Chemical Co., Ltd.

One binder resin may be used alone or a combination of two or more may be used. The amount of the binder resin, relative to the total amount of the ink, is preferably 1 to 20% by mass, and more preferably 5 to 10% by mass.

The aqueous ink preferably contains water as an aqueous solvent, and the main solvent may be water.

There are no particular limitations on the water but it is preferably water in which the ionic components are as minimal as possible. In particular, from the viewpoint of the pigment dispersion stability of the ink, the amount contained of polyvalent metal ions such as calcium is preferably small.

For example, ion-exchanged water, distilled water, ultrapure water, or the like may be used as the water. From the viewpoint of adjusting viscosity, the amount of water included relative to the total amount of the ink is preferably 20 to 90% by mass, more preferably 30 to 80% by mass, and even more preferably 40 to 70% by mass.

The aqueous ink can contain a water-soluble organic solvent. As a water-soluble organic solvent, those described above for the treatment liquid can be used.

From the viewpoints of wettability, moisture retention effect, viscosity adjustment, and the like, the amount of water-soluble organic solvent included relative to the total amount of the ink may be preferably 1 to 80% by mass, more preferably 10 to 50% by mass, and even more preferably 20 to 40% by mass.

In addition to the above-mentioned components, the aqueous ink may optionally contain various additives such as rust inhibitors, preservatives, antioxidants, UV absorbers, infrared absorbers, crosslinking agents, pH adjusters, anti-foaming agents, wetting agents (humectants), surface tension adjusters (penetrants), and fixing agents.

In order to obtain jetting properties suitable for an inkjet ink, the viscosity of the aqueous ink is, at 23° C., preferably 1 to 40 mPa·s, more preferably 3 to 20 mPa·s, and even more preferably 4 to 12 mPa·s.

The method for producing the ink is not particularly limited, but desired ink can be obtained by mixing together the components in an appropriate manner. For example, a dispersion device such as a beads mill may be used to enhance pigment dispersion. Furthermore, the obtained composition may be filtered using a filter or the like. Furthermore, various additives may be added as appropriate.

[Method for Producing Printed Matter]

According to one embodiment, it is possible to provide a method for producing printed matter that includes a step in which the treatment liquid is applied to a substrate by an inkjet system, and a step in which an aqueous inkjet ink is applied by an inkjet system with a wet-on-wet method to the substrate to which the treatment liquid has been applied. The treatment liquid and the aqueous inkjet ink according to one embodiment described above can be used for the treatment liquid and the aqueous inkjet ink.

The treatment liquid and the aqueous ink are preferably applied to the substrate by an inkjet system.

An inkjet system is a printing system that enables on-demand image formation to be performed easily and freely without coming into contact with a substrate. The inkjet system is not particularly limited and may be any system such as a piezo system, an electrostatic system, or a thermal system. When using an inkjet printing apparatus, it is preferable that the treatment liquid or the aqueous ink be jetted from an inkjet head on the basis of on a digital signal and droplets of the jetted treatment liquid or ink be adhered to the substrate.

First, a description will be given regarding the step in which the treatment liquid is applied to the substrate by an inkjet system. As described above, the treatment liquid has excellent jetting recovery performance after being left to stand, and therefore an inkjet system can be employed to apply the treatment liquid to the substrate. The area where the treatment liquid is applied to the substrate may be an area having the same shape as the image formed by the aqueous ink, may be a broad area that includes the shape of the image formed by the aqueous ink, or may be the entire surface of the substrate. The treatment liquid can be applied in an on-demand manner by an inkjet system, and therefore the application area can be adjusted according to the shape of the image formed by the aqueous ink. The amount of treatment liquid applied is preferably 0.1 to 200 g/$m^2$, and more preferably 2 to 20 g/$m^2$.

Next, a description will be given regarding the step in which the aqueous inkjet ink is applied by an inkjet system with a wet-on-wet method to the substrate to which the treatment liquid has been applied. It is preferable that the aqueous ink be applied with a wet-on-wet method to the substrate to which the treatment liquid has been applied. In other words, it is preferred that the aqueous ink be applied in a state where water is not completely removed from the substrate to which the treatment liquid has been applied, preferably in a state where the substrate to which the treatment liquid has been applied remains wet. Specifically, it is preferable that, after the treatment liquid has been applied, the aqueous ink be applied in a state where the amount remaining of the volatile content of the treatment liquid on the substrate is 60% by mass or more. For example, it is preferable that, after the treatment liquid has been applied to the substrate, the aqueous ink be applied without undergoing a drying step such as heat drying. By applying the aqueous ink while the treatment liquid is in a wet state on the substrate, the treatment liquid and the aqueous ink sufficiently mix on the substrate, the ink components uniformly aggregate, and excellent image quality can be obtained.

The temperature of the substrate surface after the application of the treatment liquid and up to the application of the aqueous ink is preferably 40° C. or less, and more preferably 35° C. or less. Furthermore, it is preferable that the treatment liquid be applied while heating the substrate regardless of the above-mentioned temperatures provided that the substrate is kept in a wet state from the treatment liquid being applied to the aqueous ink being applied. In addition, the aqueous ink may be applied while heating the substrate to which the treatment liquid has been applied. For example, the treatment liquid and the aqueous ink may be applied while heating the substrate to 30 to 60° C., preferably 35 to 45° C. Particularly when a non-permeable substrate is used as the substrate, it is preferable that the treatment liquid and the aqueous ink be applied while heating. The time from applying the treatment liquid to the substrate to applying the aqueous ink is preferably 0.1 to 200 seconds. By adopting this temperature or time, when the substrate is a non-permeable substrate, it is easier for the aqueous ink to be applied after the treatment liquid has appropriately leveled on the substrate, and when the substrate is a permeable substrate, it is easier for the aqueous ink to be applied without the treatment liquid excessively penetrating the substrate.

The amount of aqueous ink applied is preferably 0.1 to 400 g/$m^2$, and more preferably 2 to 40 g/$m^2$.

Note that one type of aqueous ink may be used in the case of single color printing, and two or more types of aqueous ink may be used in the case of color printing. When two or more types of aqueous ink are to be used, after applying the treatment liquid to the substrate, it is preferable that the first aqueous ink be applied with a wet-on-wet method, and then the next aqueous ink be applied with a wet-on-wet method.

The step of applying the treatment liquid and the step of applying the aqueous ink may be performed by separate apparatuses or may be performed using a single apparatus. In the method for producing printed matter according to one embodiment, since the aqueous ink is applied with a wet-on-wet method, a drying step is not required after applying the treatment liquid, and therefore the treatment liquid and the aqueous ink can be easily applied inline within a single printing apparatus.

A step in which the substrate is heat-treated after application of the aqueous ink can be further provided. By heat-treating the substrate to which the treatment liquid and the aqueous ink have been applied, water can be removed from the substrate. In addition, the coagulant component in the treatment liquid concentrates on the substrate, the action of aggregating the colorant in the aqueous ink is further enhanced, and printed matter having higher image quality can be obtained. When using an aqueous ink containing a binder resin, film formation of the resin on the substrate can be promoted.

The substrate may be heated in a contact or non-contact manner. Examples of heating apparatuses include hot air drying, electric heating wires, hot plates, heat rollers, and IR heaters. These heating apparatuses may be integrated with a printing apparatus. The heat treatment temperature is preferably 40 to 200° C., more preferably 60 to 180° C., and even more preferably 80 to 120° C. A temperature of 40° C. or higher enables heating to be performed efficiently and the heating time to be shortened. A temperature of 200° C. or lower enables degradation of image quality and deterioration of the substrate due to excessive heating to be prevented. The heat treatment time is preferably set in an appropriate manner according to the type of substrate, heat treatment temperature, heat treatment system, and so forth as well as the components and amounts of the treatment liquid and the aqueous ink.

A step may be further provided in which the substrate is post-treated to form an overcoat layer after the application of the aqueous ink. A method in which an overcoat liquid is applied to the substrate can be adopted as the method for post-treating the substrate. An overcoat liquid containing a resin capable of forming a film and an aqueous or oil-based medium can be used as the overcoat liquid, for example. Note that an overcoat layer does not have to be provided since excellent image quality can be obtained according to the method for producing printed matter using the treatment liquid and the aqueous ink according to one embodiment.

The above-mentioned method for producing printed matter can be applied to both permeable substrates and non-permeable substrates.

A non-permeable substrate is a substrate into the interior of which a liquid does not permeate, and, specifically, is a substrate with which the majority of the liquid components in the treatment liquid or the ink remains on the surface the substrate. Examples of non-permeable substrates include metal substrates such as metal plates of aluminum, iron, copper, titanium, tin, chromium, cadmium, and alloys (for example, stainless steel, steel, and the like); glass substrates such as plate glass of borosilicate glass, quartz glass, and soda lime glass; resin substrates such as resin sheets such as PET films, PP films, OHT sheets, polyester sheets, and polypropylene sheets, as well as acrylic sheets and polyvinyl chloride sheets; and ceramic substrates such as molded products of alumina, zirconia, steatite, and silicon nitride.

These substrates may have a plating layer, a metal oxide layer, a resin layer, or the like formed thereon, or may be subjected to a surface treatment using a corona treatment or the like.

Examples of permeable substrates include printing paper such as plain paper, coated paper, and specialty paper; fabrics such as woven fabrics, knitted fabrics, and non-woven fabrics; porous building materials for humidity control, sound absorption, heat insulation, or the like; wooden materials; concrete; and porous materials.

Here, plain paper is paper on which an ink receptive layer, film layer, or the like has not been formed on normal paper. Examples of plain paper include high-quality paper, medium-quality paper, PPC paper, rough paper, and recycled paper.

Furthermore, as coated paper, it is possible to preferably use coated inkjet paper such as matte paper, glossy paper, and semi-glossy paper, and what is referred to as coated printing paper. Coated printing paper is printing paper conventionally used for letterpress printing, offset printing, gravure printing, or the like, in which a coating layer is provided on the surface of high-quality or medium-quality paper using a coating containing an inorganic pigment such as clay or calcium carbonate and a binder such as starch. Coated printing paper is classified into finely coated paper, high-quality lightweight coated paper, medium-quality lightweight coated paper, high-quality coated paper, medium-quality coated paper, art paper, cast coated paper, and the like according to the amount of coating and the coating method.

The fibers constituting a fabric include at least one type selected from various fibers such as inorganic fibers such as metallic fibers, glass fibers, rock fibers, and slag fibers; recycled fibers such as cellulose-based and protein-based fibers; semi-synthetic fibers such as cellulose-based fibers; synthetic fibers such as polyamide, polyester, polyvinyl chloride, polyvinylidene chloride, polyacrylonitrile, polyvinyl alcohol, polyurethane, polyethylene, polypropylene, polystyrene, and polyfluoroethylene; and natural fibers such as cotton, hemp, silk, and wool.

EXAMPLES

The present invention is described below in further detail using examples. The present invention is not limited to the examples below. In the following description, "%" represents "% by mass" unless specifically stated otherwise. Raw materials for which no particular explanation is given regarding the manufacturing source are available from Tokyo Chemical Industry Co., Ltd., FUJIFILM Wako Pure Chemical Corporation, and the like. The amounts shown in each table indicate the total amount of components incorporated as solutions or dispersions, and the proportions of resin content, active ingredients, and the like are also shown.

(Production of Aqueous Ink)

The raw materials were mixed according to the formulations shown below, stirred at 100 rpm for 30 minutes using a mix rotor, and filtered through a 5-μm nylon syringe filter to obtain ink.

Water dispersion of self-dispersing pigment ("CAB-O-JET 400" manufactured by Cabot Corporation (15% solid fraction content)): 20% by mass Urethane resin emulsion ("NeoRez R-967" manufactured by DSM (40% resin content)): 22.5% by mass Glycerol: 1% by mass Diethylene glycol: 30% by mass Surfactant ("Silface SAG002" manufactured by Nisshin Chemical Industry Co., Ltd. (non-volatile fraction >95%)): 1% by mass Ion-exchanged water: 25.5% by mass (Synthesis of Silicone-Based Surfactant)

Synthesis formulations for a silicone-based surfactant used in the treatment liquid are shown in Table 1, and were synthesized using the procedure below.

The raw materials for liquid A shown in the table were placed in a flask and heated and stirred at 70° C. in a nitrogen atmosphere. The raw materials for liquid B shown in the table were mixed to make liquid B, and liquid B was added dropwise into the flask over 1 hour, and continually heated and stirred for 5 hours. The product was filtered and toluene was removed from the filtrate under reduced pressure. By-products were separated by means of column chromatography. The structural formulas of obtained activators 1 to 3 are shown in formulas (1) to (3) below, respectively. In the formulas below, $R^1$ to $R^3$ are groups each represented by $-(CH_2)_3-(OC_2H_4)_{10}-OH$.

(1)

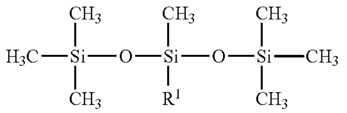

(2)

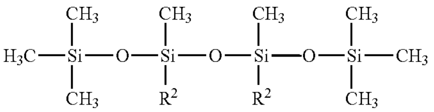

(3)

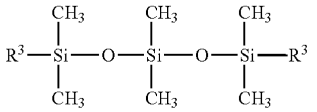

TABLE 1

| Formulations of Silicone-Based Surfactants | | | | |
|---|---|---|---|---|
| | Unit: Parts by mass | Activator 1 | Activator 2 | Activator 3 |
| Liquid A | Methyl bis(trimethylsilyloxy)silane | 11.1 | — | — |
| | 1,1,1,3,5,7,7,7-octamethyltetrasiloxane | — | 14.1 | — |
| | Dimethyl bis(dimethylsilyloxy)silane | — | — | 10.4 |
| | Toluene | 30.0 | 30.0 | 30.0 |
| Liquid B | Hydroxypolyethoxy(10)allyl ether | 24.9 | 24.9 | 24.9 |
| | ARP Platinum | 0.01 | 0.01 | 0.01 |
| | Toluene | 33.9 | 30.9 | 34.6 |

(Production of Treatment Liquid)

Formulations for the treatment liquid are shown in Tables 2 to 4. The raw materials were mixed according to the formulations shown in the tables to a total amount of 100% by mass, stirred at 100 rpm for 30 minutes using a mix rotor, and filtered through a 5-μm nylon syringe filter to obtain the treatment liquid. The components used were as shown below. The ratio "ECH:DADMAC" of the amount of DMA/ECH polycondensate and $DMA/NH_3/ECH$ polycondensate to the amount of DADMAC polymer and $DADMAC/SO_2$ copolymer is shown in the tables.

DMA/ECH polycondensate "UNISENSE KHE104L" (product name): manufactured by Senka Corporation, dimethylamine-epichlorohydrin polycondensate, resin content 20%

$DMA/NH_3/ECH$ polycondensate "UNISENSE KHE101L" (product name): manufactured by Senka Corporation, dimethylamine-ammonia-epichlorohydrin polycondensate, resin content 41%

DADMAC polymer "PAS-H-1L" (product name): manufactured by Nittobo Medical Co., Ltd., diallyldimethylammonium chloride polymer (molecular weight 8,500), resin content 28%

$DADMAC/SO_2$ copolymer "PAS-A-1" (product name): manufactured by Nittobo Medical Co., Ltd., diallyldimethylammonium chloride-sulfur dioxide copolymer (molecular weight 5000), resin content 24%

Fluorine-based surfactant "SURFLON S-243" (product name) and "SURFLON S-386" (product name): manufactured by AGC Seimi Chemical Co., Ltd., both nonionic fluorine-based surfactants, active ingredient 100%

Silicone-based surfactant: activator 1 (side chain-type modified), activator 2 (side chain-type modified), and activator 3 (terminal-type modified): synthesized according to the above-mentioned formulations (Method for Producing Printed Matter)

Two "MMP-8130" (product name) inkjet printers manufactured by Mastermind Inc. were used as printing apparatuses. The first apparatus applied the treatment liquid to the substrate, and the second apparatus applied the aqueous ink with a wet-on-wet method to the substrate to which the treatment liquid had been applied. After the aqueous ink was applied, the substrate was dried at 90° C. using a hot air dryer to produce printed matter.

The treatment liquid application conditions were as follows.

Set density: "8" in the settings of the printing apparatus.

Treatment liquid application area: a 20 cm×10 cm rectangular solid image was applied.

Treatment liquid coverage rate: 25%.

The aqueous ink application conditions were as follows.

Set density: "8" in the settings of the printing apparatus.

Ink image: the following Japanese character (meaning "beauty") was printed as a 12-point outline character within the 20 cm×10 cm rectangular solid image, superposing the area where the treatment liquid was applied.

Ink coverage rate: 100%.

The following two types of substrates were used for the substrate of the printed matter. Non-permeable substrate: polyvinyl chloride substrate ("MPI3002P WPE" (product name) manufactured by Avery Dennison Corporation), referred to as a PVC substrate in the description below.

Permeable substrate: 100% polyester fabric (tromat), referred to as a fabric substrate in the description below.

(Evaluation Method)

The image quality of the printed matter and the jetting recovery performance after being left to stand were evaluated as follows, and the results are shown in Tables 2 to 4.

[Image Quality of Printed Matter]

The treatment liquid was applied to the PVC substrate and the fabric substrate under the treatment liquid application conditions described above, and 50 seconds after application of the treatment liquid, aqueous ink was applied under the aqueous ink application conditions described above in a state where the substrates were wet due to the treatment liquid. After the aqueous ink was applied, the substrates were dried at 90° C. using a hot air dryer to obtain printed matter.

The image quality of the PVC substrate printed matter was evaluated based on the criteria below.

A: A uniform solid image is formed, and the outline character is not broken.

B: Discernible image irregularities or cracking is observed from a distance of 30 cm from the printed surface, or the outline character is partially broken but still readable.

C: Clear image irregularities or cracking is observed in the printed surface, or it is difficult to read the outline character.

The image quality of the fabric substrate printed matter was evaluated using the criteria below by measuring the OD value of the printed surface using the "X-Rite eXact" colorimeter manufactured by Videojet X-Rite K.K.

A: OD value of 1.4 or higher.

B: OD value of 1.3 or higher and less than 1.4.

C: OD value of less than 1.3.

From the evaluations of the image quality of the PVC substrate printed matter and the fabric substrate printed matter, the image quality of the printed matter was evaluated overall based on the criteria below.

A: The image quality of both the PVC substrate and the fabric substrate is A.

B: The image quality of the PVC substrate and the fabric substrate is, respectively, A and B, B and A, or B and B.

C: The image quality of at least one of the PVC substrate and the fabric substrate is C.

[Jetting Recovery Performance of the Treatment Liquid After Leaving the Head to Stand]

The procedure below was used to evaluate the jetting recovery performance after an inkjet head filled with the treatment liquid has been left to stand.

After confirming that the treatment liquid was loaded in an inkjet printer "MMP-8130" (product name) manufactured by Mastermind Inc. and that the treatment liquid jetted normally without nozzle misfires, the inkjet head was left at room temperature for one month in a capped state and was then cleaned. After the cleaning, the treatment liquid was applied to a PET (polyethylene terephthalate) film under the same conditions as the aforementioned treatment liquid application conditions. The number of white streaks observed on the substrate to which the treatment liquid was applied was counted as a number of nozzle misfires, and the percentage of nozzle misfires was calculated from the number of nozzle misfires relative to the total number of nozzles, and an evaluation was carried out based on the criteria below.

A: Nozzle misfiring after cleaning is less than 1%.

B: Nozzle misfiring after cleaning is 1% or more and less than 3%.

C: Nozzle misfiring after cleaning is 3% or more.

TABLE 2

Formulations of Treatment Liquids and Evaluation Results

| Unit: % by Mass | | Resin content/ active ingredient | Example 1 | Example 2 | Example 3 | Example 4 |
|---|---|---|---|---|---|---|
| DMA/ECH polycondensate | UNISENSE KHE104L | 20% | 10.0 | 10.0 | 12.5 | 10.0 |
| DMA/$NH_3$/ECH polycondensate | UNISENSE KHE101L | 41% | — | — | — | — |
| DADMAC polymer | PAS-H-1L | 28% | 10.7 | — | 8.9 | 10.7 |
| DADMAC/$SO_2$ copolymer | PAS-A-1 | 24% | — | 12.5 | — | — |
| Fluorine-based surfactant | SURFLON S-243 | 100% | 1.0 | — | 1.0 | 1.0 |
| | SURFLON S-386 | 100% | — | 1.0 | — | — |
| Silicone-based surfactant | Activator 1 (side chain-type modified) | 100% | 1.0 | — | 1.0 | 1.0 |
| | Activator 2 (side chain-type modified) | 100% | — | 1.0 | — | — |
| | Activator 3 (terminal-type modified) | 100% | — | — | — | — |
| Water-soluble organic solvent | Diethylene glycol | | 30.0 | 30.0 | 30.0 | — |
| | Dipropylene glycol | | — | — | — | 33.0 |
| | 1,2-butanediol | | 3.0 | 3.0 | 3.0 | — |
| Additive | Triethylamine | | 0.5 | 0.5 | 0.5 | 0.5 |
| Water | Ion-exchanged water | | Remainder | Remainder | Remainder | Remainder |
| ECH:DADMAC ratio | | | 40:60 | 40:60 | 50:50 | 40:60 |
| Evaluation result | Image quality overall evaluation | | A | A | A | A |
| | PVC substrate image quality | | A | A | A | A |
| | Fabric substrate image quality | | A | A | A | A |
| | Jetting recovery performance of treatment liquid after leaving head to stand | | A | A | A | A |

TABLE 3

Formulations of Treatment Liquids and Evaluation Results

| Unit: % by Mass | | Resin content/ active ingredient | Example 5 | Example 6 | Example 7 | Example 8 | Example 9 |
|---|---|---|---|---|---|---|---|
| DMA/ECH polycondensate | UNISENSE KHE104L | 20% | 10.0 | 20.0 | 12.5 | — | 6.3 |
| DMA/$NH_3$/ECH polycondensate | UNISENSE KHE101L | 41% | — | — | — | 4.9 | — |
| DADMAC polymer | PAS-H-1L | 28% | 10.7 | 3.6 | 8.9 | 10.7 | 13.4 |
| DADMAC/$SO_2$ copolymer | PAS-A-1 | 24% | — | — | — | — | — |

TABLE 3-continued

Formulations of Treatment Liquids and Evaluation Results

| Unit: % by Mass | | Resin content/ active ingredient | Example 5 | Example 6 | Example 7 | Example 8 | Example 9 |
|---|---|---|---|---|---|---|---|
| Fluorine-based surfactant | SURFLON S-243 | 100% | 1.0 | 1.0 | 1.0 | 1.0 | 1.0 |
| | SURFLON S-386 | 100% | — | — | — | — | — |
| Silicone-based surfactant | Activator 1 (side chain-type modified) | 100% | — | 1.0 | — | — | 1.0 |
| | Activator 2 (side chain-type modified) | 100% | — | — | 1.0 | 1.0 | — |
| | Activator 3 (terminal-type modified) | 100% | 1.0 | — | — | — | — |
| Water-soluble organic solvent | Diethylene glycol | | 30.0 | 30.0 | 30.0 | 30.0 | 30.0 |
| | Dipropylene glycol | | — | — | — | — | — |
| | 1,2-butanediol | | 3.0 | 3.0 | 3.0 | 3.0 | 3.0 |
| Additive | Triethylamine | | 0.5 | 0.5 | — | 0.5 | 0.5 |
| Water | Ion-exchanged water | | Remainder | Remainder | Remainder | Remainder | Remainder |
| ECH:DADMAC ratio | | | 40:60 | 80:20 | 50:50 | 40:60 | 25:75 |
| Evaluation result | Image quality overall evaluation | | B | B | A | A | B |
| | PVC substrate image quality | | B | B | A | A | B |
| | Fabric substrate image quality | | A | A | A | A | B |
| | Jetting recovery performance of treatment liquid after leaving head to stand | | A | A | B | B | B |

TABLE 4

Formulations of Treatment Liquids and Evaluation Results

| Unit: % by Mass | | Resin content/ active ingredient | Comparative Example 1 | Comparative Example 2 | Comparative Example 3 | Comparative Example 4 | Comparative Example 5 |
|---|---|---|---|---|---|---|---|
| DMA/ECH polycondensate | UNISENSE KHE104L | 20% | 25.0 | — | 3.8 | 10.0 | 10.0 |
| DMA/$NH_3$/ECH polycondensate | UNISENSE KHE101L | 41% | — | — | — | — | — |
| DADMAC polymer | PAS-H-1L | 28% | — | 17.9 | 15.2 | 10.7 | 10.7 |
| DADMAC/$SO_2$ copolymer | PAS-A-1 | 24% | — | — | — | — | — |
| Fluorine-based surfactant | SURFLON S-243 | 100% | 1.0 | 1.0 | 1.0 | 2.0 | — |
| | SURFLON S-386 | 100% | — | — | — | — | — |
| Silicone-based surfactant | Activator 1 (side chain-type modified) | 100% | 1.0 | 1.0 | 1.0 | — | 2.0 |
| | Activator 2 (side chain-type modified) | 100% | — | — | — | — | — |
| | Activator 3 (terminal-type modified) | 100% | — | — | — | — | — |
| Water-soluble organic solvent | Diethylene glycol | | 30.0 | 30.0 | 30.0 | 30.0 | 30.0 |
| | Dipropylene glycol | | — | — | — | — | — |
| | 1,2-butanediol | | 3.0 | 3.0 | 3.0 | 3.0 | 3.0 |
| Additive | Triethylamine | | — | — | — | — | — |
| Water | Ion-exchanged water | | Remainder | Remainder | Remainder | Remainder | Remainder |
| ECH:DADMAC ratio | | | 100:0 | 0:100 | 15:85 | 40:60 | 40:60 |
| Evaluation result | Image quality overall evaluation | | C | C | B | C | C |
| | PVC substrate image quality | | C | B | B | C | C |
| | Fabric substrate image quality | | A | C | B | A | A |
| | Jetting recovery performance of treatment liquid after leaving head to stand | | B | C | C | A | A |

As shown in the tables, good image quality was obtained for both the non-permeable substrate and the permeable substrate by printing being performed using substrates to which the treatment liquid of each example was applied. Furthermore, the jetting recovery performance of the treatment liquid of each example after leaving the head to stand was good.

In Examples 1 to 4, compared to Example 5, the treatment solution contained a side chain-type modified silicone-based surfactant, and therefore sufficient wetting and spreading of the treatment liquid on the PVC substrate was obtained and the uniformity of the solid image was better.

In Examples 1 to 4, 7, and 8, compared to Example 6, the ratio of diallyldialkylammonium halide-based polymer was higher, and therefore the aqueous ink and the treatment liquid on the PVC substrate mixed sufficiently and then aggregated, and the uniformity of the solid image was better.

In Examples 1 to 6, compared to Example 7, an amine compound was included, and therefore the jetting recovery performance of the treatment liquid after leaving the head to stand was better. This is thought to be because the amine compound functioned as a rust inhibitor, which suppressed the generation of rust within the head and also suppressed the generation of foreign matter.

In Examples 1 to 6, compared to Example 8, the treatment solution contained an aliphatic amine-epihalohydrin polycondensate of a quaternary ammonium salt not containing a secondary or tertiary ammonium salt as a constituent unit, and therefore it was possible to suppress the generation of crystals in the treatment liquid caused by the head being left to stand, and also to prevent the generation of foreign matter caused by the interaction between the polycondensate of an aliphatic amine and an epihalohydrin and the diallyldialkylammonium halide-based polymer, further improving the jetting recovery performance of the treatment liquid after leaving the head to stand.

In Examples 1 to 8, compared to Example 9, the ratio of the polycondensate of an aliphatic amine and an epihalohydrin was higher, and therefore the reaction speed between the ink components and the treatment liquid on the fabric substrate was quicker, and the image density on the fabric substrate was further improved. Furthermore, in Examples 1 to 4, 7, and 8, compared to Example 9, the ratio of the polycondensate of an aliphatic amine and an epihalohydrin was higher, and therefore the reaction between the ink components and the coagulant on the PVC substrate was accelerated, and the fine print reproducibility on the PVC substrate was further improved. Furthermore, in Examples 1 to 6, compared to Example 9, the ratio of the polycondensate of an aliphatic amine and an epihalohydrin was higher, and therefore the generation of crystals in the treatment liquid caused by the head being left to stand was further suppressed, and the jetting recovery performance of the treatment liquid after leaving the head to stand was furthermore improved.

In Comparative Example 1, the treatment liquid did not contain a diallyldialkylammonium halide-based polymer, the ink and the treatment liquid aggregated before sufficiently mixing on the PVC substrate, and in the drying step after application of the aqueous ink, the film formation was not uniform, and image cracking occurred.

In Comparative Example 2, the treatment solution did not contain a polycondensate of an aliphatic amine and an epihalohydrin, and in Comparative Example 3, the ratio of a polycondensate of an aliphatic amine and an epihalohydrin was low. In these comparative examples, a large amount of crystals were generated due to the head being left to stand with the treatment liquid therein, and there was a decrease in the jetting recovery performance of the treatment liquid after leaving the head to stand. In addition, in Comparative Example 2, the speed of the reaction between the ink components and the treatment liquid on the fabric substrate was slow, and sufficient image density on the fabric substrate was not obtained.

In Comparative Examples 4 and 5, the treatment liquid did not contain a combination of a fluorine-based surfactant and a silicone-based surfactant as a surfactant, the wettability of the treatment liquid on the PVC substrate decreased, the treatment liquid was not applied uniformly, and image irregularities were observed.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A treatment liquid that is applied to a substrate by an inkjet system, the treatment liquid comprising:
- water,
- a coagulant, and
- a surfactant,
- wherein
- the coagulant contains
- a polycondensate of an aliphatic amine and an epihalohydrin, and
- a diallyldialkylammonium halide-based polymer,
- the mass ratio of the polycondensate of the aliphatic amine and the epihalohydrin to the diallyldialkylammonium halide-based polymer is 20:80 to 90:10,
- all constituent units of cationic groups in the constituent units of the polycondensate of the aliphatic amine and the epihalohydrin are quaternary ammonium salts, and
- the surfactant contains a fluorine-based surfactant and a silicone-based surfactant.

2. The treatment liquid according to claim 1, wherein the mass ratio of the polycondensate of the aliphatic amine and the epihalohydrin to the diallyldialkylammonium halide-based polymer is 35:65 to 50:50.

3. The treatment liquid according to claim 1, further comprising an amine compound having a boiling point of 70 to 250° C.

4. The treatment liquid according to claim 1, wherein the silicon-based surfactant contains a side chain-type modified silicone-based surfactant.

5. An inkjet ink set comprising the treatment liquid according to claim 1 and an aqueous inkjet ink.

6. A method for producing printed matter, the method comprising:
- applying the treatment liquid according to claim 1 to a substrate by an inkjet system; and
- applying an aqueous inkjet ink by an inkjet system with a wet-on-wet method to the substrate to which the treatment liquid has been applied.

7. The method for producing printed matter according to claim 6, wherein the substrate is a non-permeable substrate.

8. The method for producing printed matter according to claim 6, wherein the substrate is a permeable substrate.

9. The treatment liquid according to claim 1, further comprising glycols having a boiling point of 200 to 270° C., and the amount of glycols having a boiling point of 200 to 270° C. relative to the total amount of the treatment liquid is 20 to 40% by mass.

10. A method for using the treatment liquid according to claim 1 comprising:
- applying the treatment liquid to a substrate by an inkjet system; and
- applying an aqueous inkjet ink by an inkjet system with a wet-on-wet method to the substrate to which the treatment liquid has been applied.

* * * * *